Feb. 2, 1926.
C. W. TIKALSKY
1,571,307
GREASE GUN
Filed Jan. 24, 1924
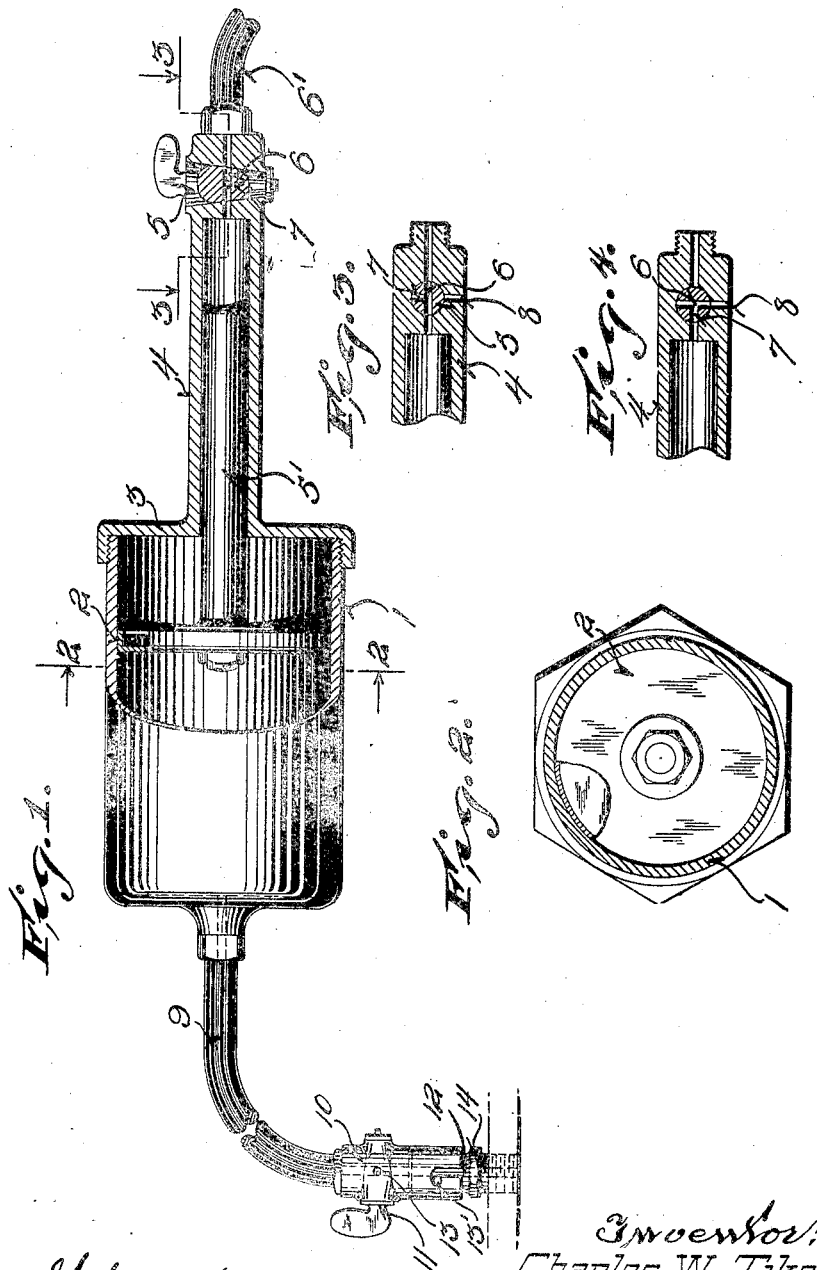

Patented Feb. 2, 1926.

1,571,307

UNITED STATES PATENT OFFICE.

CHARLES W. TIKALSKY, OF MANITOWOC, WISCONSIN.

GREASE GUN.

Application filed January 24, 1924. Serial No. 688,243.

*To all whom it may concern:*

Be it known that I, CHARLES W. TIKALSKY, a citizen of the United States, and resident of Manitowoc, in the county of Manitowoc and State of Wisconsin, have invented certain new and useful Improvements in Grease Guns; and I do hereby declare that the following is a full, clear, and exact description thereof.

This invention relates to greasing systems, and is particularly directed to a greasing system for automobiles.

In greasing automobiles it has been the practice to insert the grease at the desired points by attaching a fitting to a filling nipple at the bearing or other member and to connect this filling nipple with a manually operated member having a plunger advanced by a screw thread. This was necessarily a tedious operation and required an extended amount of time for completely greasing automobile parts. Further the requisite pressure could not be attained as a matter of actual practice to accomplish all of the desirable results connected with greasing automobiles which will appear in the discussion of this invention.

It is to overcome these defects that this invention is designed, and objects of such invention are to provide a greasing system for automobiles which permits the rapid greasing of the parts, which automatically supplies the grease without requiring effort on the part of the operator, which will supply the grease at a pressure sufficient to insure its passage to all parts of the bearing and which will force any obstruction such as accumulated matter out of the bearing and flood the bearing with grease as well as filling any retaining cup or member that the bearing may have.

Further objects are to provide a greasing device which is so constructed that the attaching fitting may be relieved of pressure to permit its easy removal from the bearing, to provide means whereby the pressure supplied the grease may be easily controlled, and to provide a device which is highly practical and may be readily and cheaply produced.

An embodiment of the invention is shown in the accompanying drawings, in which:—

Figure 1 is a view of one form of the device, such figure being partly in section.

Figure 2 is a transverse sectional view on the line 2—2 of Figure 1.

Figure 3 is a sectional view on the line 3—3 of Figure 1.

Figure 4 is a view similar to Figure 3 showing the valve in a different position.

In this system the grease gun may comprise a cylinder 1 within which is slidably fitted a piston 2. The rear end of the cylinder 1 is provided with a cap 3, screw threaded thereon and equipped with a rearwardly extending guiding portion 4. The piston rod 5' loosely fits within the guiding portion 4 and permits compressed air or other suitable fluid to freely pass and to directly act upon the rear face of the piston. At the rear end of the extension 4 of the cylinder head, a three way valve 5 is mounted and controls the compressed air supplied through the flexible conduit 6. This valve 5, as will be seen from Figures 3 and 4, is provided with a passage way therethrough, adapted to permit the passage of compressed air into the cylinder. However, when the valve is turned in the position shown in Figure 4, the auxiliary passage 7, which is in communication with the passage 6 is then placed in direct communication with external air through the medium of the passage 8 formed in the rear portion of the extension 4, as shown in Figure 4.

The cylinder 1 is filled with grease when the compressed air is cut off and, thereafter, the piston is inserted and the cylinder head 3 screwed into place. This grease is adapted to be forced through a flexible conduit 9 from the forward end of the cylinder. The outer end of this flexible conduit is secured to a fitting 10 provided with a three way valve 11 similar to the valve 5. The outer end of the fitting 10 is provided with bayonet slots 12 adapted to interlock with pins 13' which are regularly provided upon the filling nipples or supply nipples 14 of the bearings of the automobile.

In operating the device the fitting 10 is secured to the filling nipple 14, as previously described, and the valve 5 is opened to permit compressed air to act against the rear face of the piston 2 thus compressing the grease and forcing it under pressure into the conduit 9. When it is desired to supply the grease to the bearing the valve 11 is opened and the grease under pressure is forced into the bearing and into any filling cups that may be provided for the bearing. When the filling of this bearing is completed, the valve 11 is turned to cut off the grease and to place the outer end of the fitting 10 in communication with the auxiliary duct 13 corresponding to the duct 8 previously described. This relieves the pressure upon the outer side of the fitting 10 and permits the free uncoupling of the fitting from the nipple 14. Thereafter, the fitting 10 is engaged with the next nipple and the valve 11 is opened thus permitting the grease to pass into the bearing. It will be seen that this operation may be very rapidly repeated without any effort on the part of the operator, and that the bearings will be thoroughly flooded with grease, and that any débris or obstructions will be forced from the bearing due to the action of the high pressure of the grease.

If desired, the valve 5 may be turned to cut off the compressed air after each filling operation, or it may be employed to cut off the air only when the device is not in use after the entire automobile has been greased. In this connection it is to be noted that by providing the three way valve 5, the pressure on the rear face of the piston may be relieved and the cylinder 1 may be readily re-filled with grease by removing the piston and cylinder head 3.

Obviously, it is within the province of this invention to make the forward cylinder head the removable portion of the device for refilling purposes.

It is to be particularly noted that difficulty would be experienced in removing the fitting 10 from the nipple 14 after the filling operation due to the great pressure existing between the fitting and the nipple and holding the fitting in interlocked position with such nipple. However, this pressure is relieved by suitable manipulation of the valve 11, as previously described, thus permitting the free and easy disconnecting of the fitting from the nipple.

It will thus be seen that a greasing system has been provided which is power operated and which supplies grease under pressure to the bearings without requiring any effort on the part of the operator.

It will further be seen that the apparatus may be most readily controlled and that the greasing operation may be quickly completed until all of the bearings have been successively greased.

Although the invention has been described in considerable detail, it is to be understood that the invention may be variously embodied and is, therefore, to be limited only as claimed.

I claim:

A greasing device comprising a cylinder adapted to contain the grease, and having a discharge fitting at one end, and being open at the other end, a cylinder head for closing said open end, said cylinder head and said cylinder having interengaging parts, a piston mounted within said cylinder and having a rearwardly projecting piston rod passing through said cylinder head, said cylinder head having a tubular extension loosely receiving and guiding said piston rod and having a fitting at its outer end, and adapted to be connected to a source of fluid pressure, and a three way valve mounted within the tubular extension of said piston head, and adapted to connect said tubular extension either with said source of fluid pressure or with the external air.

In testimony that I claim the foregoing I have hereunto set my hand at Manitowoc, in the county of Manitowoc and State of Wisconsin.

CHARLES W. TIKALSKY.